United States Patent [19]

Yamauchi et al.

[11] 4,103,143
[45] Jul. 25, 1978

[54] ELECTRODES FOR TUNGSTEN INERT GAS WELDING

[75] Inventors: Nobuyuki Yamauchi; Takao Taka, both of Amagasaki, Japan

[73] Assignee: Sumitomo Metal Industries, Ltd., Osaka, Japan

[21] Appl. No.: 800,010

[22] Filed: May 24, 1977

[30] Foreign Application Priority Data

May 28, 1976 [JP] Japan .................................. 51-62547

[51] Int. Cl.² ............................................ B23K 35/00
[52] U.S. Cl. ............................................... 219/145.21
[58] Field of Search ......................................... 219/145

[56] References Cited

U.S. PATENT DOCUMENTS 3,198,932  8/1965  Weatherly ............................ 219/145
3,780,259  12/1973  Meyer ................................... 219/145

Primary Examiner—J. V. Truhe
Assistant Examiner—John H. Bouchard
Attorney, Agent, or Firm—Fleit & Jacobson

[57] ABSTRACT

Electrode for tungsten inert gas welding having a body of a circular cross-section with a frustoconical tip end having a cone angle less than 120°. The electrode is formed with an axially extending cylindrical recess at the tip end to leave an annular area. The configuration of the electrode is effective to decrease the intensity of the arc force so that the welding process can be performed with a heavy current and high speed.

7 Claims, 3 Drawing Figures

ELECTRODES FOR TUNGSTEN INERT GAS WELDING

The present invention relates to tungsten inert gas weldings and more particularly to electrodes for use in such weldings. More specifically, the present invention pertains to electrodes suitable for use in tungsten inert gas weldings performed under heavy welding currents.

The tungsten inert gas welding which will hereinafter be referred to simply as TIG welding is known as a welding process in which welding is progressed with an atmosphere of inert gas maintained around a welding zone where welding arc is produced between a tungsten electrode and materials to be welded. It has been considered very difficult or almost impractical in this type of welding process to use a heavy current which is as large for example as 400 amp., although such heavy current is advisable in attaining an increased welding speed. It has in fact been experienced that under a heavy current there are often produced defective welding beads such as undercut and humping beads due to an excessively intensified arc force.

In order to overcome the problem and make it possible to use a heavy current in TIG welding process, several proposals have been made. The tungsten welding electrode for the TIG welding process usually has a frustoconical tip and one of such proposals is to use an electrode having an increased cone angle. Such increased cone angle is considered as effective to produce a low arc force. However, there is a limit in such cone angle and the cone angle exceeding 120° will cause an instability of arc.

Another proposal for solving the problem is to use an electrode having an increased tip diameter. However, this proposal is disadvantageous in that the welding arc is not produced uniformly throughout the tip area of the electrode but the arc may be displaced aside or unstably moved in the tip area.

It has also been proposed to bias the welding arc forwardly by applying a magnetic field to the arc or by inclining the electrode. However, there is also a limit in the inclination of the arc and experiences show that the inclination exceeding 45° will make it impossible to have the materials molton under the arc.

Thus, previous proposals have not been effective to solve the aforementioned problem in the TIG welding using a heavy current exceeding 400 amp.

It is therefore an object of the present invention to provide a tungsten electrode which can provide a stable welding arc even in a TIG welding process using a heavy current.

Another object of the present invention is to provide a tungsten electrode for a TIG welding process which can produce an arc of less intensity even under a heavy current.

According to the present invention, the above and other objects can be accomplished by a tungsten welding electrode comprising a body of substantially circular cross-section having a diameter not less than 3 mm, said body having a tip end formed with an axial recess of substantially circular cross-section having a depth not less than 2 mm, said recess being substantially co-axial with the body to leave an annular tip area having a radial width not greater than 3 mm.

According to a preferable mode of the present invention, the body is of frustoconical shape at the tip and the diameter at the tip is such that the ratio of the depth of the recess to the diameter at the tip is not less than 0.4 Further, it is preferable that the cone angle at the tip is less than 120°.

The tungsten electrode in accordance with the present invention is found as being particularly suitable for use in a TIG welding process under a welding current higher than 300 amp., but it should be noted that the electrode may well be used in a process performed with a lower current. The recess as formed in the electrode of the present invention is distinguishable from the recess formed in the electrode for metal inert gas welding processes because the latter is provided for charging the flux material.

The present invention will now be described with reference to a preferable embodiment taking reference to the accompanying drawings, in which.

Figure 1:
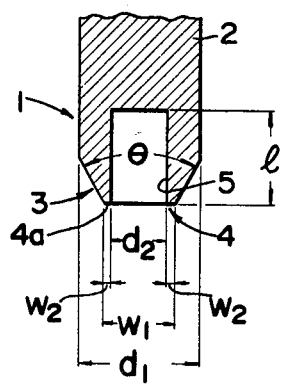
FIG. 1 is a longitudinal sectional view of the tungsten welding electrode in accordance with the present invention.
Figure 2:
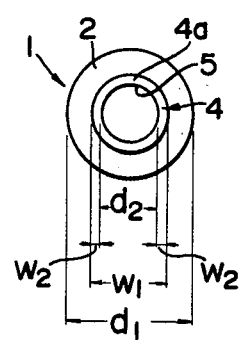
FIG. 2 is an end view of the electrode shown in FIG. 1.

Referring to the drawings, particularly to FIGS. 1 and 2, there is shown a tungsten electrode 1 comprising a body 2 of a circular cross-section which has a diameter $d_1$. The body 2 of the electrode 1 has a tip portion 3 which is of frustoconical shape having a cone angle $\theta$. The tip portion 3 has a substantially flat tip surface 4 which has a diameter W1 and where an axial recess 5 of a circular cross section is formed as shown in the drawings. The recess 5 is substantially co-axial with the body 2 and has a diameter $d_2$ and a depth $l$. Thus, there is left in the tip surface 4 an annular area 4a having a radial width $W_2$.

In order that the electrode 1 be used in a welding process under a heavy current such as a current more than 300 amp., it is preferable that the body 2 of the electrode 1 is not less than 3 mm in diameter. The depth $l$ of the recess 5 shall not be less than 2 mm. Otherwise, arc may possibly be produced even in the recess 5 causing instability of welding arc. The electrode may not be formed with the frustoconical tip portion 3 as shown. Further, an electrode of tubular shape may also be covered by the present invention provided that dimensional limitations are met.

The width $W_2$ of the annular area 4a shall not be greater than 3 mm in order to produce a stable welding arc. When a frustoconical tip portion 3 is provided, the cone angle $\theta$ shall not be greater than 120° because there may be a possiblity that an arc is produced in the conical surface under the cone angle $\theta$ exceeding 120°. Further, the ratio of the depth $l$ of the recess 5 to the diameter $W_1$ of the tip surface 4 should preferably be not less than 0.4.

It has been found that in accordance with the present invention a stable welding arc is produced uniformly throughout the annular area 4a. Further, since the arc is thus distributed throughout the area 4a, the density of the arc can be decreased and consequently any welding defects can effectively be avoided even under a heavy current. The distribution of the arc can be changed as desired by suitably determining the diameter $d_2$ of the recess, for example, with an electrode having a relatively small radial width $W_2$ of the annular area 4a, the density of the arc is small at the central part which corresponds to the recess 5 as compared with the density of the arc in the annular zone corresponding to the annular area 4a. However, where the annular area 4a is of relatively large radial width $W_2$, the arc density at the central part becomes larger.

EXAMPLES

Welding operations were performed using electrodes prepared in accordance with the present invention and the results were compared with the results of welding operations using conventional electrodes. The following table shows the particulars of the tungsten electrodes used in the tests.

| ELECTRODES | SAMPLE | $d_1$ (mm) | $\theta$ (degree) | $W_1$ (mm) | $d_2$ (mm) | $W_2$ (mm) | l (mm) |
|---|---|---|---|---|---|---|---|
| Prior Art | 1 | 8 | 60 | 1 | | | |
|  | 2 | 8 | 90 | 1 | | | |
|  | 3 | 8 | 120 | 1 | | | |
| Invention | 4 | 8 | 30 | | 3 | 0.5 | 5 |
|  | 5 | 8 | 30 | | 4 | 0.5 | 5 |
|  | 6 | 8 | 30 | | 5 | 0.5 | 5 |

Figure 3:
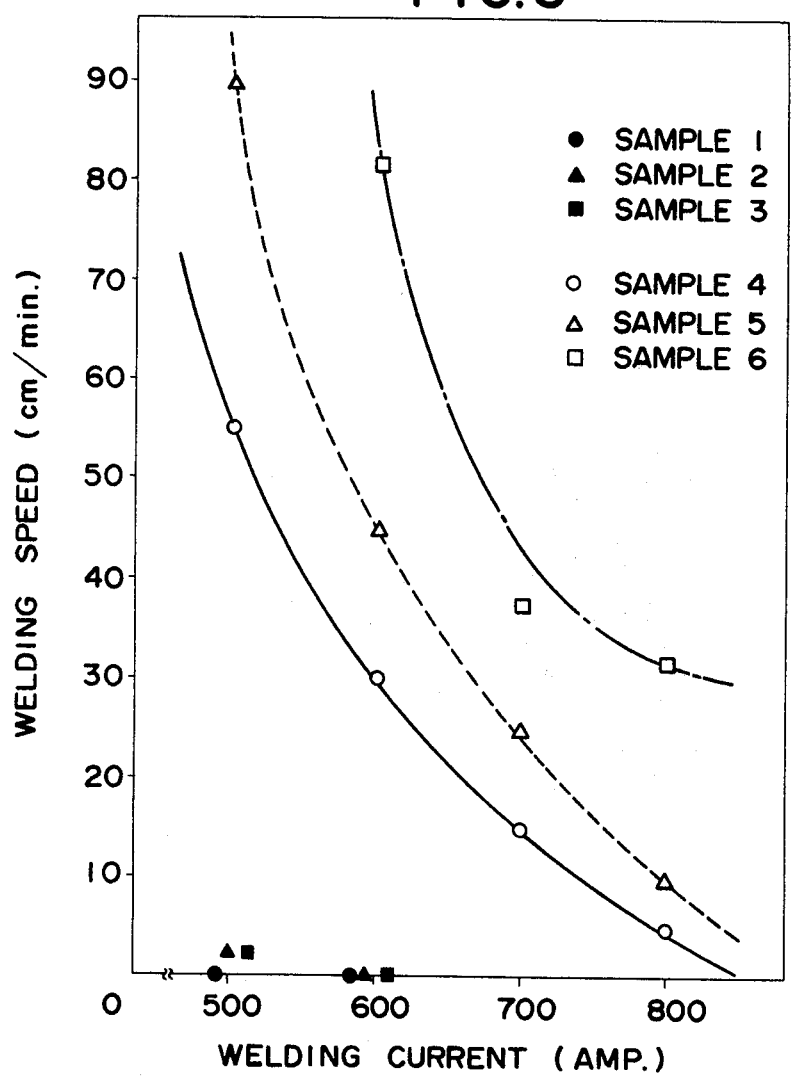
FIG. 3 is a diagram showing the allowable limit of the welding speed.

FIG. 3 shows the results of the test in terms of the relationship between the welding current and the allowable limit of the welding speed. The allowable limit as used herein is defined as the limit of the welding speed beyond which welding defects may be produced.

In FIG. 3, it will be noted that, with conventional tungsten electrodes, it is impossible to perform welding under the welding current exceeding 500 amp., since welding defects are produced due to an intense arc force. However, with the electrodes in accordance with the present invention, welding operations can satisfactorily be performed under a welding current exceeding 500 amp. For example, with the samples 4 and 5, it is possible to maintain the welding speeds of 55 cm/min. and 9 cm/min., respectively. Better results can be obtained with larger recess diameters. For example, with the sample 6 having the recess diameter of 5 mm, it is possible to maintain the welding speed of 30 cm/min even under the welding current of 800 amp.

The invention has thus been shown and described with reference to a preferable embodiment and examples, however, it should be noted that the invention is in no way limited to the details of the illustrated structures but changes and modifications may be made without departing from the scope of the appended claims.

We claim:

1. Tungsten electrode for TIG welding comprising a body of substantially circular cross-section having a diameter not less than 3 mm, said body having a tip end formed in a frustoconical shape having a cone angle less than 120° and having an axial recess of substantially circular cross-section having a depth not less than 2 mm, said recess being substantially co-axial with the the body to leave an annular tip area having a radial width not greater than 3 mm.

2. Tungsten electrode in accordance with claim 1 in which said frustoconical shape cone angle is 30°.

3. Tungsten electrode in accordance with claim 1 in which said tip end has a diameter which is such that the ratio of the depth of the recess to the diameter of the tip end is not less than 0.4.

4. Tungsten electrode in accordance with claim 1 wherein said diameter of said body is 8 mm and said depth of said recess is 5 mm.

5. Tungsten electrode in accordance with claim 4 wherein the diameter of said recess of circular cross-section is 3 mm.

6. Tungsten electrode in accordance with claim 4 wherein the diameter of said recess of circular cross-section is 4 mm.

7. Tungsten electrode in accordance with claim 4 wherein the diameter of said recess of circular cross-section is 5mm.

* * * * *